B. Oldfield.
Narrow Ware.
No. 2,379. Fig. 1 Reissued Oct. 16, 1866.
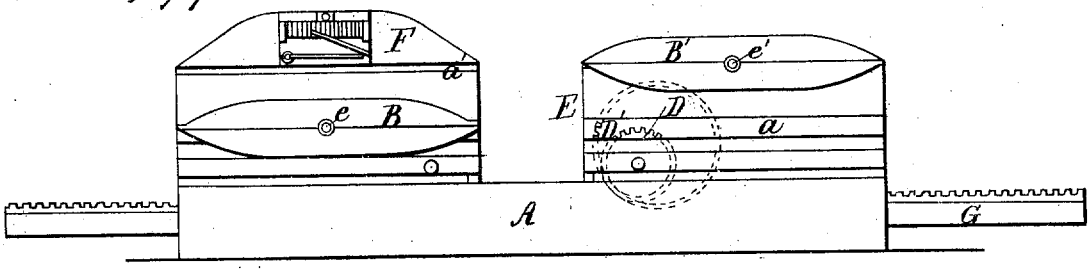
Fig. 2
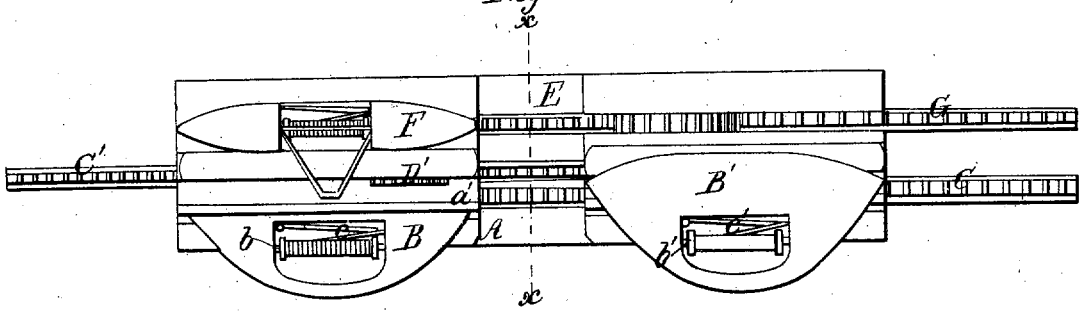
Fig. 3
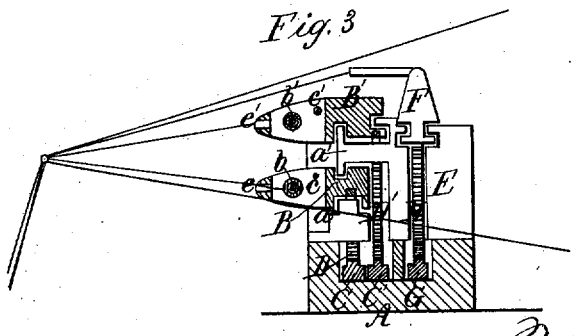
Witnesses
Hus Tus Q
Wm Dzurin
Inventor
B Oldfield
per Munn & Co
attys
N. PETERS, PHOTO-LITHOGRAPHER, WASHINGTON, D. C.

UNITED STATES PATENT OFFICE.

BENJAMIN OLDFIELD, OF NEWARK, NEW JERSEY.

IMPROVEMENT IN LOOMS.

Specification forming part of Letters Patent No. 52,192, dated January 23, 1866; antedated January 17, 1866; Reissue No. 2,379, dated October 16, 1866.

DIVISION B.

*To all whom it may concern:*

Be it known that I, BENJAMIN OLDFIELD, of Newark, Essex county, State of New Jersey, have invented a new and useful Improvement in Looms; and I do hereby declare that the following is a full, clear, and exact description thereof, which will enable others skilled in the art to make and use the same, reference being had to the accompanying drawings, forming a part of this specification, in which—

Figure 1 represents a front elevation of this invention. Fig. 2 is a plan or top view of the same. Fig. 3 is a transverse vertical section of the same, the line *x x*, Fig. 2, indicating the plane of section.

Similar letters of reference indicate like parts.

This invention consists in the arrangement of an upright shuttle, in combination with a rack and pinion sunk in suitable cavities or grooves of the batten, in such a manner that much labor is saved in the construction of the batten, and more than the ordinary number of shuttles moving in a horizontal plane can be made to pass through one opening in the warp.

The wood from the center of the shuttle is cut entirely away to admit of the quill, and a metal guard is provided above the quill to prevent the shuttle or the quill from catching the warp as it is passing through.

F represents the upright shuttle, which works in a groove or race in the top of the batten or lay, in contradistinction to the shuttles B B′, which work in the breast of the batten, in the ordinary manner. Suitable grooves in the sides of the shuttle F prevent the same from becoming detached spontaneously, and a set of cogs, *s*, cut in its bottom edge, gear in a series of pinions, H, to which a revolving motion is imparted alternately in one direction and then in the other by the action of a toothed rack, G.

The shuttle is made by preference of wood, though it can be made of any other suitable material, and the wood from the center of the shuttle is cut entirely away, as clearly shown in Figs. 1 and 2 of the drawings.

A guard, *g*, of metal or any other suitable material, prevents the shuttle and the quill from catching in the warp. This guard is provided with an eye, through which the thread passes out.

By this arrangement the construction of the shuttle is materially simplified, and two or more shuttles can be placed side by side, or in the same plane, and made to pass through a comparatively small opening or shed of the warp; and, furthermore, where two or more shuttle-races are made in the upper surface of the batten, one parallel to the other and each containing a series of upright shuttles, the pinions which impart motion to the several series of shuttles can all be made of uniform size, and two or more pinions can be placed on the same pin, which is a great saving of labor.

I claim as new and desire to secure by Letters Patent—

An upright shuttle driven by rack and pinion, or in any other suitable manner, and which is grooved on each of its sides, and the body part of which is cut away for the quill and provided with a guard, *g*, substantially in the manner and for the purpose herein set forth.

The above specification of my reissue signed by me this 18th day of July, 1866.

BENJAMIN OLDFIELD.

Witnesses:

WM. F. MCNAMARA,

W. HAUFF.